United States Patent [19]
Kitano

[11] Patent Number: 5,649,231
[45] Date of Patent: Jul. 15, 1997

[54] STORAGE CONTROL METHOD AND APPARATUS HAVING A BUFFER STORAGE FOR TRANSFERRING VARIABLE AMOUNTS OF DATA TO A MAIN STORAGE BASED ON CURRENT SYSTEM LOAD

[75] Inventor: Yukihiko Kitano, Kawasaki, Japan

[73] Assignee: Fujitsu Limited, Kawasaki, Japan

[21] Appl. No.: 327,848

[22] Filed: Oct. 21, 1994

[30] Foreign Application Priority Data

Jan. 25, 1994 [JP] Japan ................................ 6-006158

[51] Int. Cl.⁶ ............................................. G06F 13/24
[52] U.S. Cl. ...................... 395/879; 395/872; 395/853
[58] Field of Search ............................ 395/880, 821, 395/250, 879, 872, 853; 364/DIG. 1

[56] References Cited

U.S. PATENT DOCUMENTS

| | | | |
|---|---|---|---|
| 3,898,623 | 8/1975 | Cormier | 395/879 |
| 3,970,997 | 7/1976 | Daly et al. | 395/880 |
| 4,374,415 | 2/1983 | Cormier et al. | 395/879 |
| 4,460,959 | 7/1984 | Lemay et al. | 395/445 |
| 4,648,027 | 3/1987 | Toyooka et al. | 364/184 |
| 4,692,895 | 9/1987 | Huffman | 395/879 |
| 4,807,112 | 2/1989 | Hamasaki | 395/879 |
| 5,249,271 | 9/1993 | Hopkinson et al. | 395/250 |
| 5,280,587 | 1/1994 | Shimodaira et al. | 395/880 |
| 5,394,527 | 2/1995 | Fakhruddin et al. | 395/879 |
| 5,414,816 | 5/1995 | Oyadomari | 395/880 |

*Primary Examiner*—Tod R. Swann
*Assistant Examiner*—J. Peikari
*Attorney, Agent, or Firm*—Staas & Halsey

[57] ABSTRACT

The storage control system reduces the system load on a main storage unit by staggering data transfer to minimize a busy condition on the main memory bus, while maintaining a block size sufficient to ensure a good hit rate in a buffer storage. To achieve such a reduction, the system transfers a variable quantity of data from the buffer storage to the main storage unit, wherein the quantity of data is predetermined based on a detected load on the main storage unit. When the detected load is reduced, another variable quantity of data may be transferred.

4 Claims, 7 Drawing Sheets

STORAGE CONTROL METHOD AND APPARATUS HAVING A BUFFER STORAGE FOR TRANSFERRING VARIABLE AMOUNTS OF DATA TO A MAIN STORAGE BASED ON CURRENT SYSTEM LOAD

BACKGROUND OF THE INVENTION

1. Field of the Invention

The present invention relates to a storage control method and a storage control apparatus used in an information processing system equipped with a buffer storage for the purpose of a quick data access. In particular, the present invention relates to a control method performed when the buffer storage fetches data thereinto.

2. Description of the Related Art

It is a common practice to equip a buffer storage (hereinafter occasionally referred to as a BS) between a main storage unit and a processing unit in a modern information processing system in order to meet a requirement to increase a data processing rate. Namely, a part of data that seems to be frequently used by the processing unit among data in the main storage unit is stored in a high-speed, small capacity memory called a buffer storage, thereby shortening an effective access time from the processing unit and improving a performance of the entire information processing system.

The buffer storage has, however, an extremely smaller capacity than the main storage unit. The buffer storage, therefore, sometimes does not contain the data required by the processing unit. In this case, it is, of course, necessary to fetch the required data from the main storage unit. A process to fetch data into a buffer storage is termed "move-in". A quantity of data moved from the main storage unit to the buffer storage has a significant effect on a hit rate representing a rate that the data is present in the buffer storage and a busy condition of the main storage unit. Therefore, an appropriate control of the data quantity to be moved can improve the performance of an information processing system.

In practice, the buffer storage has a data unit divided into units called blocks, each including several tens to several hundreds of bytes, where data is stored in such a way as to correspond to data held in the main storage unit. The buffer storage also has memory called a tag unit, which like the data unit, is divided into blocks, into which entries corresponding to the respective blocks of the data unit are stored one-by-one. Into each entry of the tag unit, an address of the main storage unit of a corresponding block is stored.

When receiving a request for data from the processing unit, the tag unit in the buffer storage is first referred to. If an address of the required data is stored in any entry, it is judged that the required data is present in the data unit in the buffer storage, and the data in a corresponding block is sent out to the processing unit. If an address of the required data is not stored in the tag unit, it is judged that the required data is absent from the buffer storage so that the required data is moved to the buffer storage from the main storage unit.

In the conventional technique, data for a given block size is always moved to the buffer storage. That is, data of a predetermined quantity has been heretofore moved irrespective of a busy condition of the main storage unit or an input queue to the main storage unit. The block size is, in general, set several times larger than a magnitude of the data that the processing unit directly requires in order to fetch collectively data in the vicinity of the required data since the data in the vicinity of the required data has a high probability to be used in future, so as to improve a probability of presence of the data (i.e., a hit rate) in the buffer storage. On the other hand, such a measure has a drawback in that an increase in the block size is prone to cause a memory busy state for a long time. The block size is, therefore, set within a range from several tens to several hundreds of bytes.

In some programs executed by the processing unit, frequently issued branch instructions may cause a discontinuation in executed instructions or addresses of processed data. Under such circumstances, if data for one block is moved into the buffer storage, there are some cases where a part of the data remains unused. Since data for one block is moved according to the conventional technique, more data than required is fetched, as a consequence.

As above, the conventional technique may cause a busy condition of the storage unit due to move-in of unnecessary data, leading to an increase in waiting time, an increase in memory access time and a degradation of the processing performance of the information processing system. To solve these shortages, it is effective to decrease the block size. The decreased block size, however, may cause a decrease in the hit rate, an increase in the number of entries of the tag unit, and further, an increase in cost due to an increased amount of materials. From a total view, it is not always a good plan to decrease the block size thoughtlessly.

SUMMARY OF THE INVENTION

To overcome the above problems, the present invention is directed to a method and apparatus which can ease an excessive busy condition of a main storage unit while ensuring transfer of a block size of data from the main storage unit to a buffer storage sufficient to improve a hit rate in the buffer storage, so as to avoid deterioration of the performance of an information processing system when the main storage unit has a large load.

The present invention, therefore, provides a storage control method in an information processing system having a main storage unit, a processing unit operating on the basis of data in the main storage unit and a buffer storage holding a copy of a part of the data in the main storage unit, comprising the steps of detecting a load on the main storage unit upon moving data from the main storage unit to the buffer storage, and altering a quantity of the data to be moved from the main storage unit to the buffer storage according to the detected load on the main storage unit.

The present invention also provides a storage control apparatus in an information processing system having a main storage unit, a processing unit operating on the basis of data in the main storage unit and a buffer storage holding a copy of a part of data in the main storage unit, such that the storage control apparatus comprises a load detecting unit detecting a load on the main storage unit when data is moved from the main storage unit to the buffer storage, and a move-in data quantity altering unit altering a quantity of data to be moved from the main storage unit to the buffer storage according to the load on the main storage unit detected by the load detecting unit.

According to the above storage control method and apparatus in an information processing system of the present invention, it is possible to ease a further increase in the load on the main storage unit caused by the move-in of data to the buffer storage when the main storage unit is at a large load and to reduce the waiting time, while ensuring transfer of a block size of data from the main storage unit to the buffer storage sufficient to improve a hit rate in the buffer storage.

The data quantity to be moved from the main storage unit to the buffer storage is controllably altered according to a load condition of the main storage unit, thereby greatly improving a stable processing performance of the information processing system.

Figure 1:
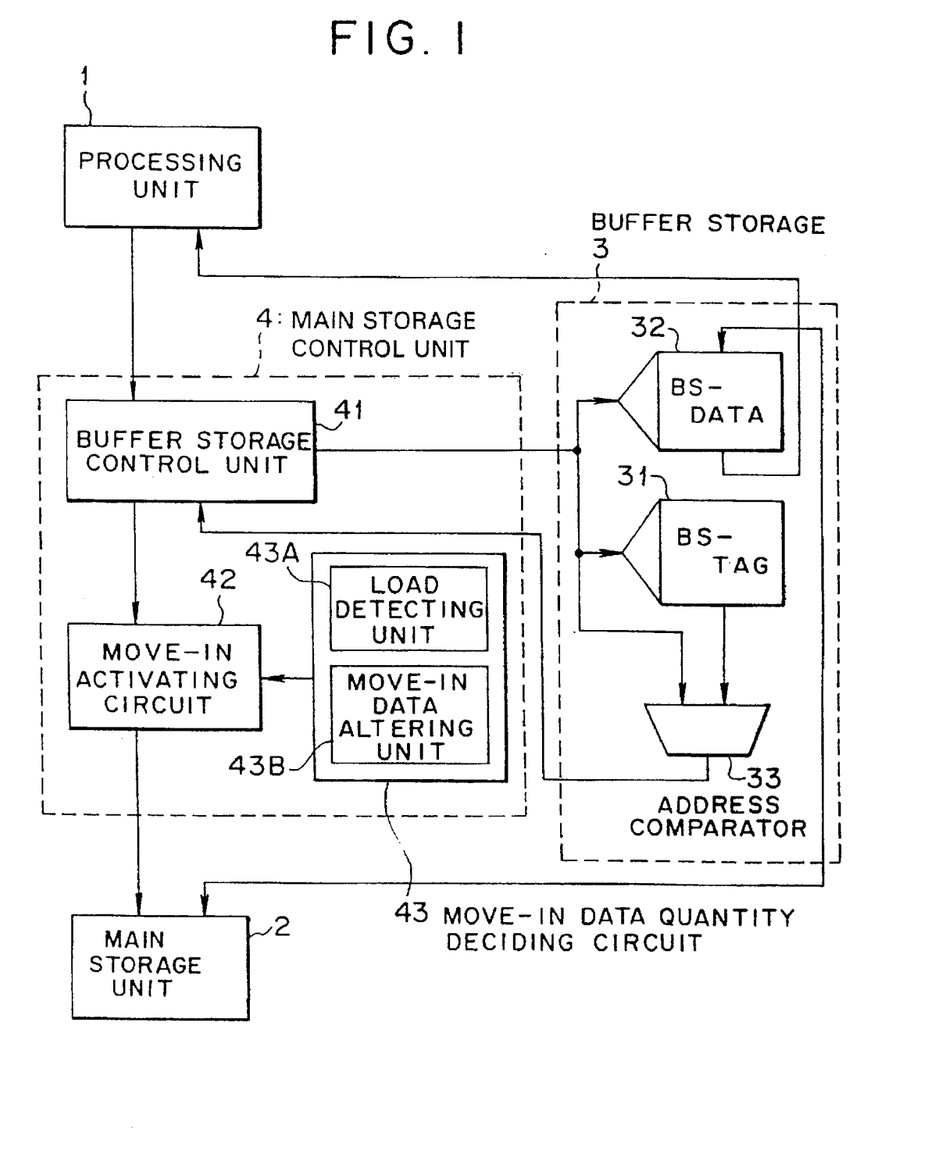
FIG. 1 is a block diagram illustrating an aspect of the present invention.

DESCRIPTION OF THE PREFERRED EMBODIMENTS (a) Description of An Aspect of The Present Invention Referring now to FIG. 1 showing an aspect of the present invention, a processing unit fetches and executes an instruction, a main storage unit 2 stores data used by the processing unit 1, and a buffer storage 3 holds a copy of a part of the data stored in the main storage unit 2. The buffer storage 3 includes a tag unit (BS-TAG) 31, a data unit (BS-TAG) 32 and an address comparator 33.

The data unit 32 stores the copy of a part of data in the main storage unit 2 in blocks. The tag unit 31 stores entries such that each entry corresponds to each block in the data unit 32 one-by-one. In each entry, in address in the main storage unit 2 of a corresponding block is stored.

When receiving a request for data from the processing unit 1 through a main storage control unit 4, which will be described later, the address comparator 33 compares an address stored in the tag unit 31 with an address of the requested data. If it is ascertained from a result of the comparison executed by the address comparator 33 that an address corresponding to the required data is stored in any entry in the tag unit 31, it is judged that the required data is present in the data unit 32 so that the data in the corresponding block is transferred to the processing unit 1 from the data unit 32.

The main storage control unit 4 controls an access to the buffer storage 3 or the main storage unit 2, including a buffer storage control unit 41, a move-in activating circuit 42 and a move-in data quantity deciding circuit 43.

The buffer storage control unit 41 controls the buffer storage 3 in response to a request for data from the processing unit 1. The move-in activating circuit 42 activates a move-in operation to move data from the main storage unit 2 to the buffer storage 3, if the data of the address requested by the processing unit 1 is absent from the buffer storage 3. That is, it is ascertained from a result of a comparison executed by the address comparator 33 in the buffer storage 3 that an address corresponding to the required data is not stored in the tag unit 31.

The move-in data quantity deciding circuit 43 determines a quantity of data to be moved on the basis of information about a load condition of the main storage unit 2, including a load detecting unit 43A and a move-in data quantity altering circuit 43B. The load detecting unit 43A detects a load on the main storage unit 2 at the time of move-in of data from the main storage unit 2 to the buffer storage 3. The move-in data quantity altering unit 43B alters a quantity of data to be moved from the main storage unit 2 to the buffer storage 3, depending on a load on the main storage unit 2 detected by the load detecting unit 43A.

The move-in data quantity altering unit 43B cuts and/or alters a quantity of data to be moved from the main storage unit 2 to the buffer storage 3 when a load on the main storage unit 2 detected by the load detecting unit 43A is large. It is possible to additionally provide a move-in resumption processing unit which resumes a move-in operation to move the remaining data that has been cut out when the load on the main storage unit 2 becomes smaller after the cut and/or alteration.

The load detecting unit 43A can judge and detect a load on the main storage unit 2 on the basis of a busy condition of ports for the main storage unit 2. The move-in data quantity altering unit 43B can alter and/or cut as a unit a quantity of data to be moved by one-nth (where n is an integer equal 2 or more) the data quantity moved when the main storage unit 2 is at a small load.

According to the present invention stated above, the buffer storage control unit 41, when accepting a request from the processing unit 1, outputs an instruction of move-in to the move-in activating circuit 42 if it is ascertained from a result of the address comparison executed by the address comparator 33 that requested data is absent from the buffer storage 3.

The move-in data quantity deciding circuit 43 judges a load condition of the main storage unit 2 on the basis of a result of the detection by the load detecting circuit 43A. In the case of a large load, the move-in data quantity deciding circuit 43 allows the move-in data altering unit 43B to alter the moved data quantity and sets the same to be smaller than the block size (a half or a quarter, etc., for example) of the buffer storage 3, and then sends the altered move data quantity to the move-in activating circuit The move-in activating circuit 42 requires data of a required quantity from the main storage unit 2 according to the results from the moved data quantity deciding circuit 43. If there is a block in the buffer storage 3 in which data is partly moved due to a large load on the main storage unit 2, bits representing the data which is partly moved are set at a corresponding entry in the tag unit 31.

The rest of the data that has been partly moved in the block is moved from the main storage unit 2 when a request for that data is generated by the processing unit 1, or is automatically moved by the move-in resumption processing unit when the main storage unit 2 changes from a large load to a small load.

According to the present invention, a quantity of data to be moved is made smaller when the main storage unit 2 is at a large load so that a large quantity of data is not recklessly fetched when the main storage unit 2 is at a large load. Consequently, only essential data and data in the vicinity of that data are fetched from the main storage unit 2 to the buffer storage 3, thereby avoiding a development of a busy condition of the main storage unit 2 and reliably avoiding a drop in the processing performance.

Also according to the present invention, a quantity of data to be moved is cut out when the main storage unit 2 is at a large load. Thereafter, when the main storage unit 2 enters a state of a small load, the rest of the data that has been moved into a block of the buffer storage 3 is next moved, thereby avoiding a decrease in the hit rate at the same time of data access after that.

Still further, it is possible to determine a load on the main storage unit 2 from, for example, a busy condition of the ports for the main storage unit 2. It is also possible to manage each block in the buffer storage 3 without increasing the number of entries by decreasing as a unit a quantity of data moved when the main storage unit 2 is at a large load by one-nth (where n is an integer equal to 2 or more) the normal full block size of the buffer storage 3.

(b) Description of the First Embodiment

Figure 2:
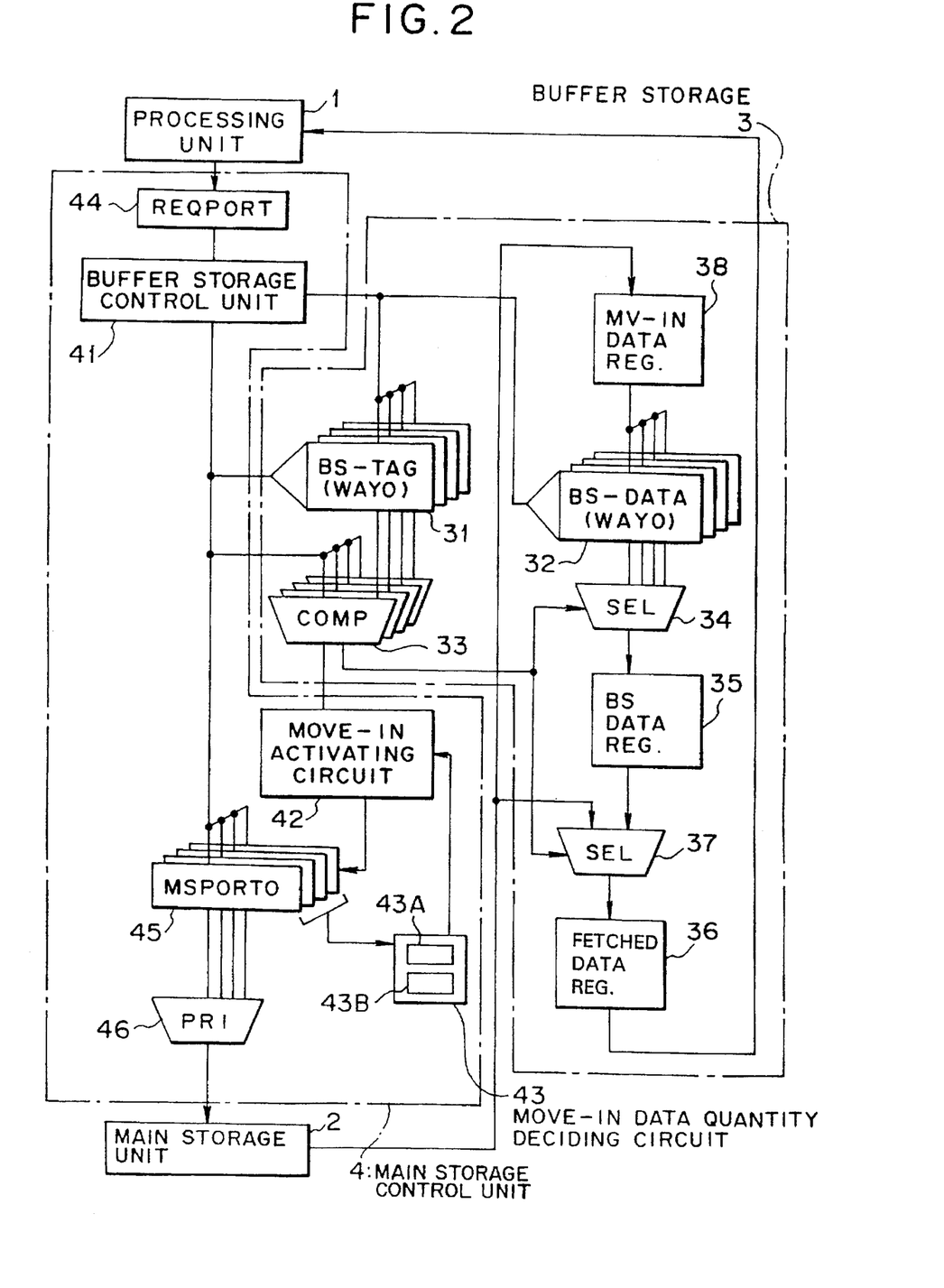
FIG. 2 is a block diagram showing a configuration of an information processing system according to a first embodiment of the present invention.

Now, referring to FIG. 2, description will be made of a configuration of an information processing system according to a first embodiment of this invention. In FIG. 2, like reference characters designate like or corresponding parts shown in FIG. 1, a detailed description of which is omitted here.

In FIG. 2, reference numeral 1 denotes a processing unit, 2 a main storage unit (occasionally referred to as an MS, hereinafter), 3 a buffer storage, and 4 a main storage control unit.

The buffer storage 3 has a tag unit (BS-TAG) 31, a data unit (BS-DATA) 32, an address comparator 33, selectors (SELs) 34 and 37, a BS data register 35, a fetched data register 36 and a moved data register 38.

Figure 4:
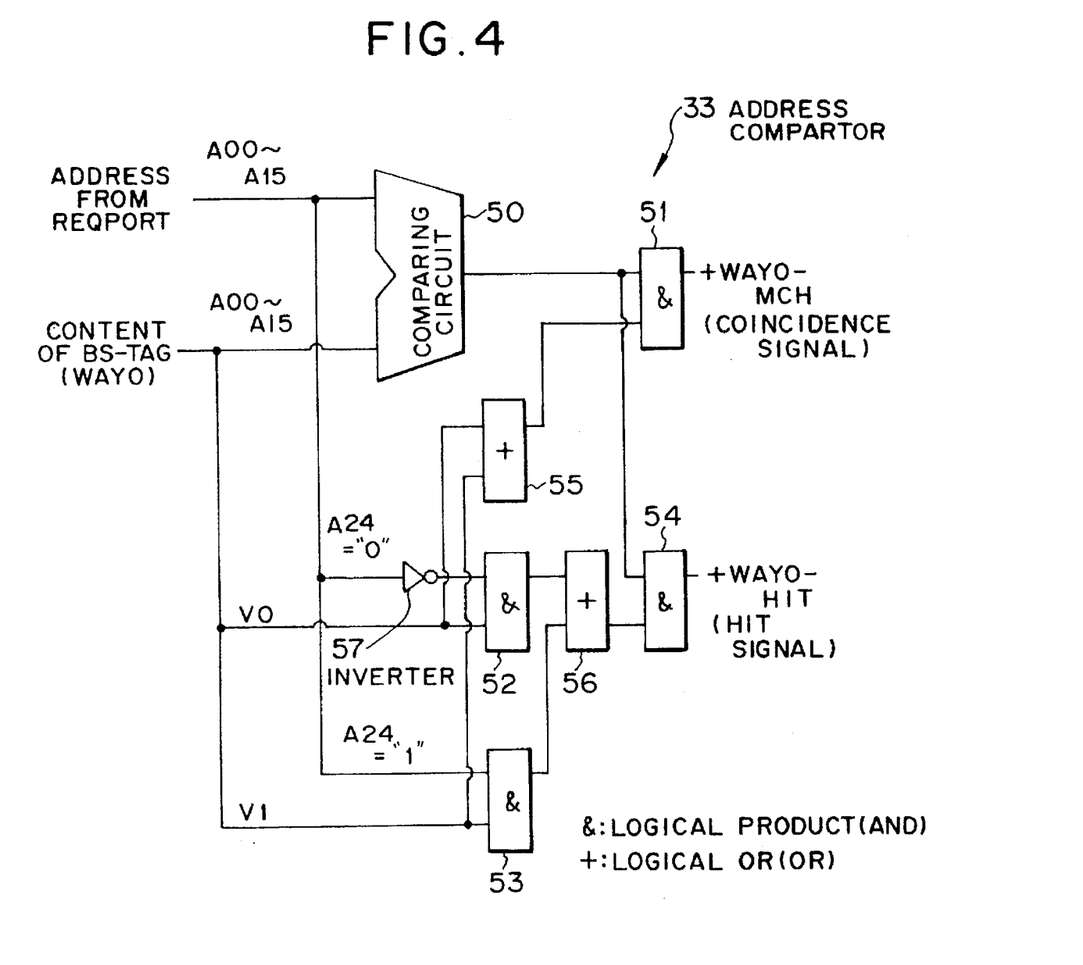
FIG. 4 is a block diagram showing an example of a configuration of an address comparator according to the first embodiment.

The address comparator 33, whose configuration will be described later with reference to FIG. 4, compares an address of required data with an output of the tag unit 31 in order to verify whether the data required by the processing unit 1 is present, or is a hit, in the buffer storage 3.

The selector 34 selects an output of a hit WAY among outputs of four WAYs of the data unit 32 according to a result of the comparison executed by the address comparator 33. "WAY" indicates how may addresses are held in the same entry of the tag unit 31. The BS data register 35 holds data read out from the data unit 32. The fetched data register 36 holds data to be sent to the processing unit 1.

The other selector 37 selects data to be sent to the processing unit 1 according to a result of the comparison executed by the address comparator 33. When the data required by the processing unit 1 is a hit in the buffer storage 3, the selector 37 selects data held in the BS data register 35, and outputs it to the fetched data register 36. When the data required from the processing unit 1 is not a hit in the buffer storage 3, the selector 37 selects data to be moved from the main storage unit 2, and outputs it to the fetched data register 36.

The main storage control unit 4 has a buffer storage control unit 41, a move-in activating circuit 42, a move-in data quantity deciding circuit 43, a request port (REQPORT) 44, ports (MSPORT) 45 and a priority circuit (PRI) 46.

The buffer storage control unit 41 controls the buffer storage 3 in response to a request for data from the processing unit 1. The move-in activating circuit 42 activates a move-in operation to move data from the main storage unit 2 to the buffer storage 3 when the requested data is not a hit in the buffer storage 3.

The move-in data quantity deciding circuit 43 determines a quantity of data to be moved on the basis of the information about a load condition of the main storage unit 2, comprising a load detecting unit 43A and a move-in data quantity altering unit 43B, which have been described in connection with FIG. 1. A configuration of the move-in data quantity deciding circuit 43 will be described in detail hereinafter in connection with FIG. 5. The load detecting unit 43A judges and detects a load on the main storage unit 2 on the basis of a busy condition of ports for the main storage unit 2. The move-in data quantity altering unit 43B alters a quantity of data to be moved from the main storage unit 2 to the buffer storage 3 and cuts by one-nth the data quantity moved as a unit at the time of a small load on the main storage unit 2, if a load on the main storage unit 2 detected by the load detecting unit 43A is large. Incidentally, n is an integer equal to 2 or more, preferably a power of 2. In this embodiment, n=2.

The request port 44 accepts a request from the processing unit 1. The ports 45 set an access to the main storage unit 2. The priority circuit 46 selects one of the four ports 45 to send an access set in the selected port to the main storage unit 2.

The buffer storage 3 according to this embodiment is configured with (256 byte blocks)×(256 entries)×(4 WAYS) =256K bytes.

For instance, an address of data is allocated to a byte address of the bit 0 (A00) through the bit 31 (A31). The tag unit 31 is referred to the bit 16 (A16) through the bit 23 (A23) of the address, in which the bit 0 (A00) through the bit 15 (A15) are stored. Therefore, the address comparator 33 performs an address comparison by the bit 0 (A00) through the bit 15 (A15). In this embodiment, a request for data from the processing unit 1 is conducted by 64 bytes as a unit.

Figure 3:
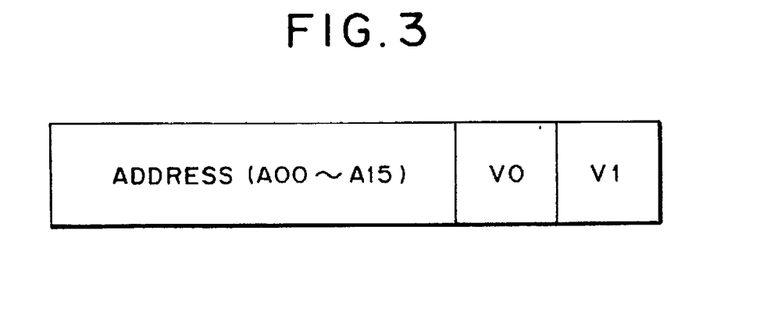
FIG. 3 is an illustration showing a content of an entry in a tag unit in a buffer storage according to the first embodiment.

Referring to FIG. 3, a description will be now made of a content of the entry of tag unit 31 in the buffer storage 3. In FIG. 3, bits (A00–A15) of the address are an address in the main storage unit 2 of data held in a corresponding block in the buffer storage 3. "V0" and "V1" are valid bits of the former half 128 bytes and the latter half 128 bytes concerning the corresponding block. More specifically, if "V0" and "V1" are both 0, it means that the block in the buffer storage 3 is entirely invalid. If "V0" is 0 and "V1" is 1, it means that only the latter half 128 bytes in that block in the buffer storage 3 are valid. If "V0" is 1 and "V1" is 0, it means that only the former half 128 bytes in the block in the buffer storage 3 are valid. If "V0" and "V1" are both 1, it means that the block in the buffer storage 3 is entirely valid.

FIG. 4 illustrates an internal configuration of the address comparator 33, which compares an output of the tag unit 31 with an output from the request port 44. In FIG. 4, reference numeral 50 denotes a comparing circuit, 51 through 54 AND gates, 55 and 56 OR gates and 57 an inverter.

The comparing circuit 50 compares the bits A00–A15 of the address of requested data accepted by the request port 44 with the bits A00–A15 which are output from the tag unit 31 (WAY0), and outputs a "1" when the above two are the same. =p According to this embodiment, there is set information representing which one of the former and the latter half of the requested data is essential at the bit A24 of the address of the requested data accepted by the request port 44. Namely, if the bit A24 is "0", it indicates that the former half of the data block is essential. If the bit A24 is "1", it indicates that the latter half of the data block is essential.

The inverter 57 inverts the bit A24 of the address of the requested data, and outputs the inverted bit A24 to the AND gate 52. The AND gate 52 outputs a logical product of the output of the inverter 57 and bit V0 is an output of the tag unit 31. The AND gate 53 outputs a logical product of the bit A24 of the address of the requested data and bit V1 that is an output of the tag unit 31.

The OR gate 55 outputs a logical OR of the bit V0 and the bit V1 which are output from the tag unit 31. The OR gate 56 outputs a logical OR of an output of the AND gate 52 and an output of the AND gate 53. The AND gate 51 outputs a logical product of an output of the comparing circuit 50 and an output of the OR gate 55. The AND gate 54 outputs a logical product of an output of the comparing circuit 50 and an output of the OR gate 56.

When the bits A00–A15 of the address of the requested data accepted by the request port 44 match the bits A00–A15 that are an output of the tag unit 31 (WAY0), and either the bit V0 or the bit V1 is "1" (that is, either the former half or the latter half of the requested data block in the data unit 32 is valid), it is judged that the address is the same.

Accordingly, in the address comparator 33 mentioned above, the comparing circuit 50 compares the bits A00–A15 of the address of the requested data accepted by the request port 44 with the bits A00–A15 that are output from the tag unit 31 (WAY0). When the comparison results in a match, an output of the comparing circuit 50 becomes "1" When either the bit V0 or the bit V1 is "1", an output of the OR gate 55 becomes "1". The AND gate 51 therefore outputs "1" as a coincidence signal (+WAY0–MCH).

Hit or mishit of the address of the requested data from the processing unit 1 is judged by detecting whether a data portion (the former half or the latter half of the data block) that is essential as the requested data from the processing unit 1 is in coincidence with a portion of the data block that is valid in the data unit 32.

More specifically, when the bit A24 of the address of the requested data is 0 (that is, the former half of the data block is essential) and the bit V0 is 1 (that is, the former half of the data block is valid), outputs of the AND gate 52 and the OR gate 56 become 1. When the bit A24 of the address of the requested data is 1 (that is, the latter half of the data block is essential) and the bit V1 is 1 (that is, the latter half of the data block is valid), outputs of the AND gate 53 and the OR gate 56 become 1.

When an output of the comparing circuit 50 is 1 and an output of the OR gate 56 is 1, that is, the address of the requested data and an address output of the tag unit 31 match each other and the essential part of the requested data and the valid part in the data unit 32 match each other, the AND gate outputs "1" as a hit signal (+WAY0–HIT).

Circuits of the address comparator 33 are provided to each WAY, generating a hit signal of the entire buffer storage 3 with a logical OR (OR) of the four circuits of the address comparator 33. A coincidence signal of each WAY and a logical OR (OR) of the hit signal obtained in the above manner are sent to the move-in activating circuit 42.

Figure 5:
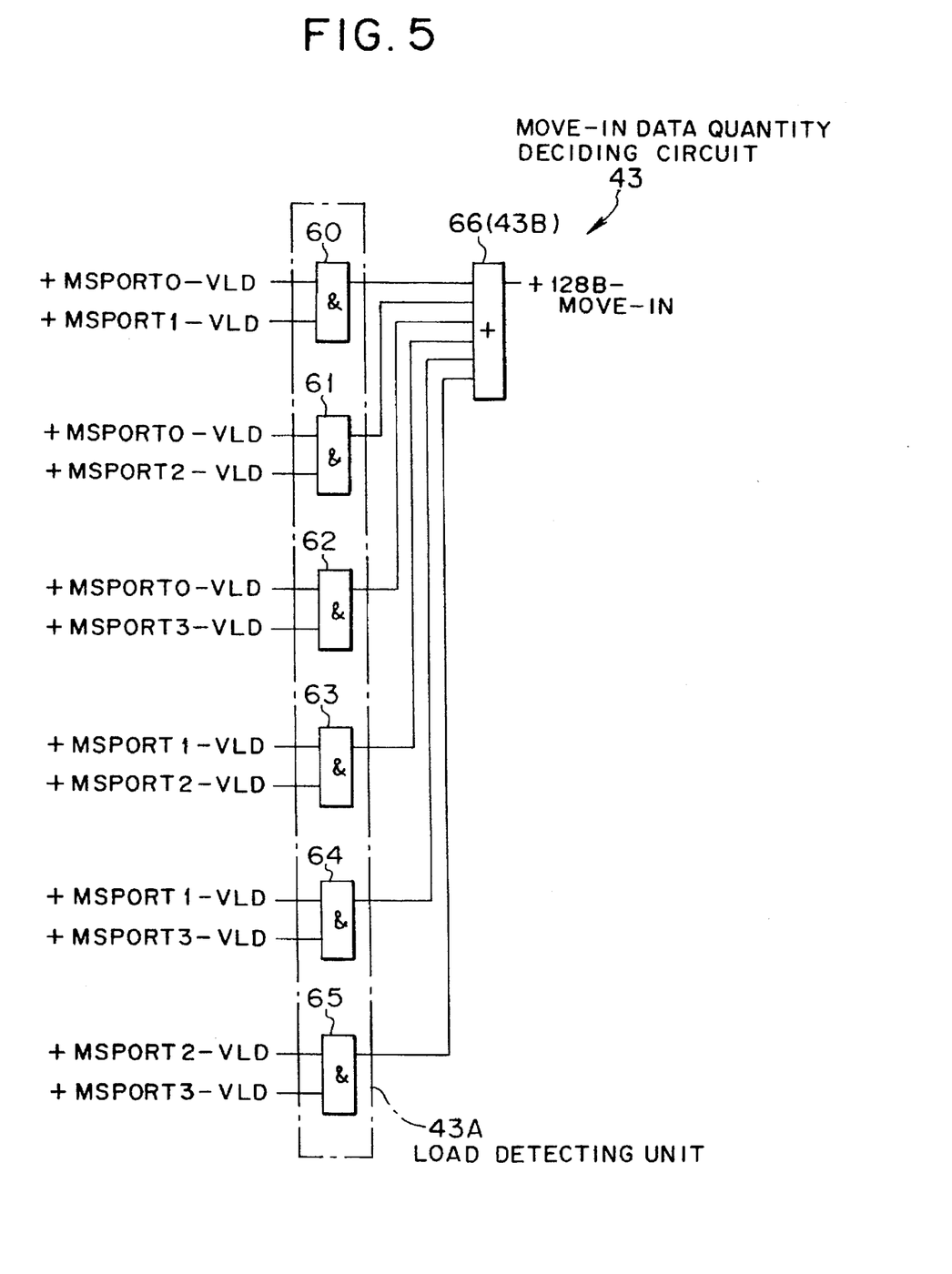
FIG. 5 is a block diagram showing an example of a configuration of a moved data quantity deciding circuit according to the first embodiment.

Now, referring to FIG. 5, a description will be made of an example of an internal configuration of the move-in data quantity deciding circuit 43. In FIG. 5, reference numerals 60 through 65 denote AND gates forming a load detecting unit 43A, and reference numeral 66 denotes an OR gate functioning as the move-in data quantity altering unit 43B.

A signal +MSPORTi–VLD (where i is 0 through 3), input to each of the AND gates 60–65, represents whether the four ports 45 for the main storage unit 2 are in use or not. The signal +MSPORTi–VLD is 1 when each port 45 is in use.

A signal +128B–MOVE-IN is output from the OR gate 66 to the move-in activating circuit 42. When the signal +128B–MOVE-IN is "0", a moved data quantity transferred from the main storage unit 2 to the buffer storage 3 is set to 256 bytes for a small load. When the signal +128–MOVE-IN is "1", the moved data quantity is cut down and altered to 128 bytes, which is one-half of the data quantity of 256 bytes in the case of a small load.

The moved data quantity deciding circuit 43 judges from a state of a load on the main storage unit 2 detected by the load detecting unit 43A whether the load is small or large. According to this embodiment shown in FIG. 5, when two ports out of the four ports 45 for the main storage unit 2 are valid, that is, there are two or more move-in requests to the main storage unit 2, it is judged to be a large load. When it is judged that the main storage unit 2 is at a large load (that is, any one of the outputs from the AND gates 60–65 is "1"), an output of the OR gate 66 (of the move-in data quantity altering unit 43B) is made "1", and the move-in activating circuit 42 is notified to move 128 bytes, which is one-half of the whole block normally having 256 bytes in the case of a small load from the main storage unit 2 to the buffer storage 3.

Next, an operation of the information processing system with the above configuration according to the first embodiment will be described with reference to a flowchart (Steps A1 through A11) shown in FIG. 6.

A 64-byte fetch access requested from the processing unit 1 is stored in the present port 44 of the main storage control unit 4 (Step A1). By using an address in the request port 44, the tab unit 31 of the buffer storage 3 is retrieved to allow the address comparator 33 to make a judgment as to whether it is a hit or not.

If it is a hit, the selector 34 selects an output of the data unit 32 according to an output of the address comparator 33, and sends data of 64 bytes read out form the data unit 32 to the processing unit 1 via the BS data register 35, the selector 37 and the fetched data register 36 (Step A3).

If it is not a hit (that is, it is a mishit), it is judged whether the bit V0 and the bit V1 of the tag unit 31 are both "0" or not (Step A4). If the bits "V0" and "V1" are both "0", neither the former half or the latter half of a block containing the requested data is present in the buffer storage 3. As a result, the move-in activating circuit 42 is activated to execute move-in of the data for one block of 256 bytes.

At this time, the load detecting unit 43A in the move-in data quantity deciding circuit 43 judges whether the main storage unit 2 is at a large load or a small load (Step A5), according to this embodiment. In other words, if the number of the valid ports 45 is 2 or more, it is judged that the main storage unit 2 is at a large load. On the other hand, if the number of the valid ports 45 is 1 that is smaller than 2, it is judged that the main storage unit 2 is not at a large load.

When it is judged that the main storage unit 2 is not at a large load at Step A5, an output of the move-in data quantity altering unit 43B is "0", the move-in activating circuit 42 thus sets a move-in request for data of 256 bytes to a disengaged port 45 (Step A6).

The move-in request set in the port 45 is selected by the priority circuit 46, then sent to the main storage unit 2. The data to be moved of 256 bytes read out from the main storage unit 2 is stored in a corresponding entry in the data unit 32 through the move-in data register 38, and data of the leading 64 bytes is, at the same time, sent to the processing unit 1 via the selector 37 and the fetched data register 36 (Step A7). When this move-in process is completed, "1" is set to the bits "V0" and "V1" of the entry of the tag unit 31 storing the data (Step A8).

If it is judged that the main storage unit 2 is at a large load at Step A5, an output of the move-in data quantity altering unit 43b becomes "1" in order to avoid a further busy condition of the main storage unit 2 so that the move-in activating circuit 42 sets a move-in request of data for 128 bytes, which is one-half the amount of the normal data, to a disengaged port 45 (Step A9).

The move-in request set in the port 45 is selected by the priority circuit 46, then sent to the main storage unit 2. The moved data of 128 bytes read out from the main storage unit 2 is stored in a corresponding entry of the data unit 32 via the moved data register 38, and data of the leading 64 bytes is sent to the processing unit 1 through the selector 37 and the fetched data register 36 (Step A10). When this move-in process is completed, 1 is set to either the bit "V0" or the bit "V1" corresponding to the data of 128 bytes in the entry of the tag unit 31 storing the data (Step A11).

In the case where the tag search conducted at Step A2 does not result in a hit, but the coincidence signal (that is an output of the AND gate 51) is "1", or it is judged at Step A4 that either the bit "V0" or the bit "V1" is 1, there is data for 128 bytes, not including the data for 64 bytes requested by the processing unit 1, in the buffer storage 3.

Then, a move-in request for data for the necessary 128 bytes is set to the disengaged port 45 (Step A9). The requested data is sent from the main storage unit 2 to the data unit 32 and the processing unit 1 (Step A10). Thereafter, either the bit "V0" or the bit "V1" that is 0 in the entry in the tag unit 31 storing the data is set to "1".

As stated above, when the main storage unit 2 is at a large load, it is possible to reduce a data quantity to be moved to a half of the data quantity to be moved in a normal state so that only the essential data and data in the vicinity of the essential data may be fetched from the main storage unit 2 to the buffer storage 3, thereby avoiding a further busy condition of the main storage unit 2 and reliably avoiding degradation of the processing performance.

(c) Description of Second Embodiment

A configuration of an information processing system according to a second embodiment will be described with reference to FIG. 7, wherein like reference characters designated corresponding parts in FIG. 1 or 2, whose detailed description is emitted here.

Figure 7:
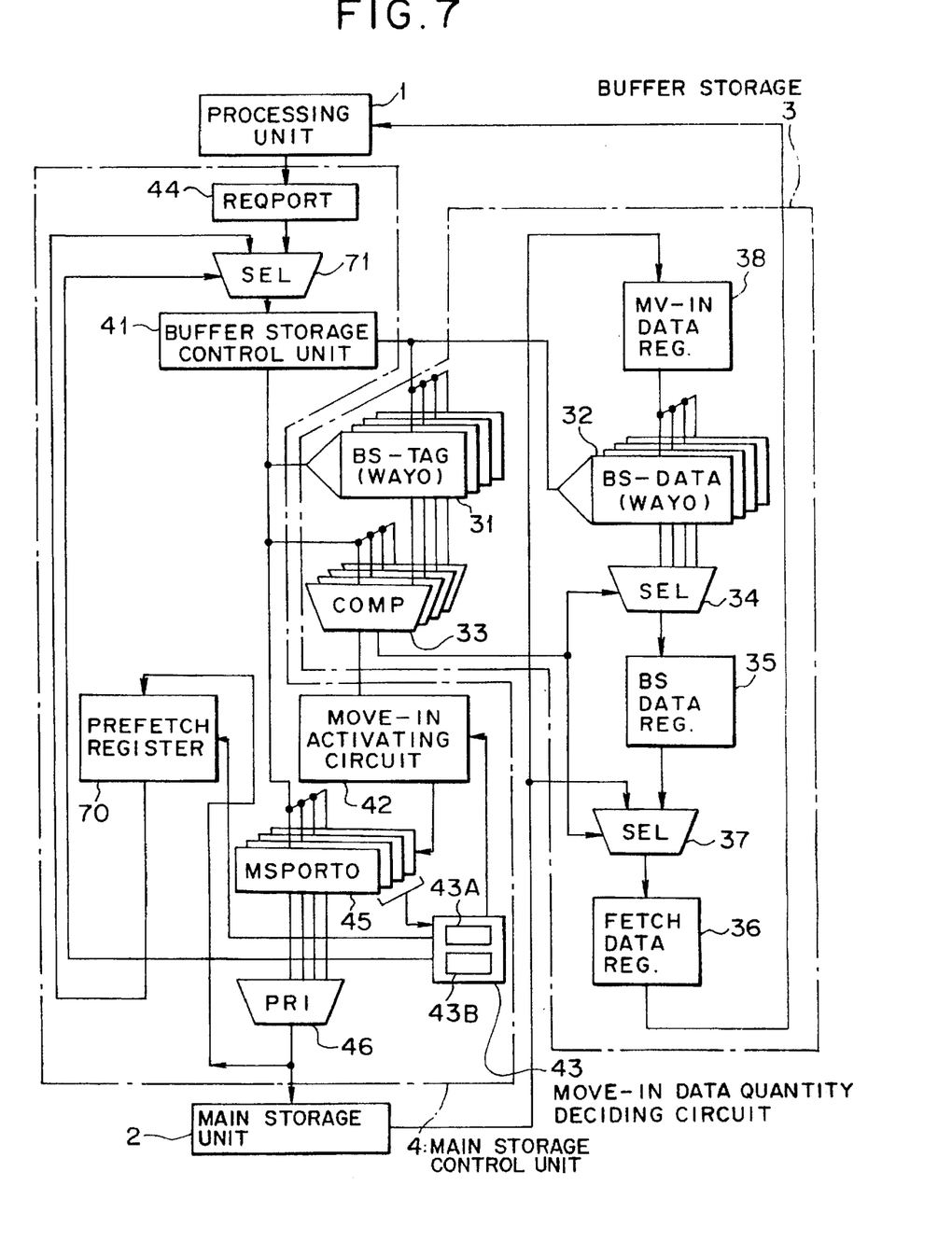
FIG. 7 is a block diagram showing a configuration of an information processing system according to a second embodiment of the present invention.

As shown in FIG. 7, the information processing system according to the second embodiment has substantially the same configuration as the information processing system according to the first embodiment.

However, a prefetch register 70 and a selector (SEL) 71 are additionally provided to the main storage control unit 4 in the second embodiment.

The prefetch register 70 and the selector 71 operate in response to a signal from the moved data quantity deciding circuit 43. The prefetch register 70 and the selector 71 function as a move-in resumption processing unit which resumes move-in of data that has been cut out when a load of the main storage unit 2 becomes smaller, after the move-in data quantity deciding circuit 43 has cut out and altered a moved data quantity responsive to a large load on the main storage unit 2, as described in connection with the first embodiment.

Namely, the prefetch register 70 holds an address of data to be moved when the main storage unit 2 enters a small load state. The selector 71 selects between an output (an address) of the prefetch register 70 and an address of the requested data accepted by the request port 44, and outputs the selected one to the buffer storage control unit 41. If a load on the main storage unit 2 becomes smaller after the moved data quantity was cut out and altered responsive to a large load on the main storage unit 2, the selector 71 selects an output (a move-in request) of the prefetch register 70.

Next, an operation of the information processing system with the above configuration according to the second embodiment will be described with reference to a flowchart (Steps A1 through A16) shown in FIG. 8.

Figure 6:
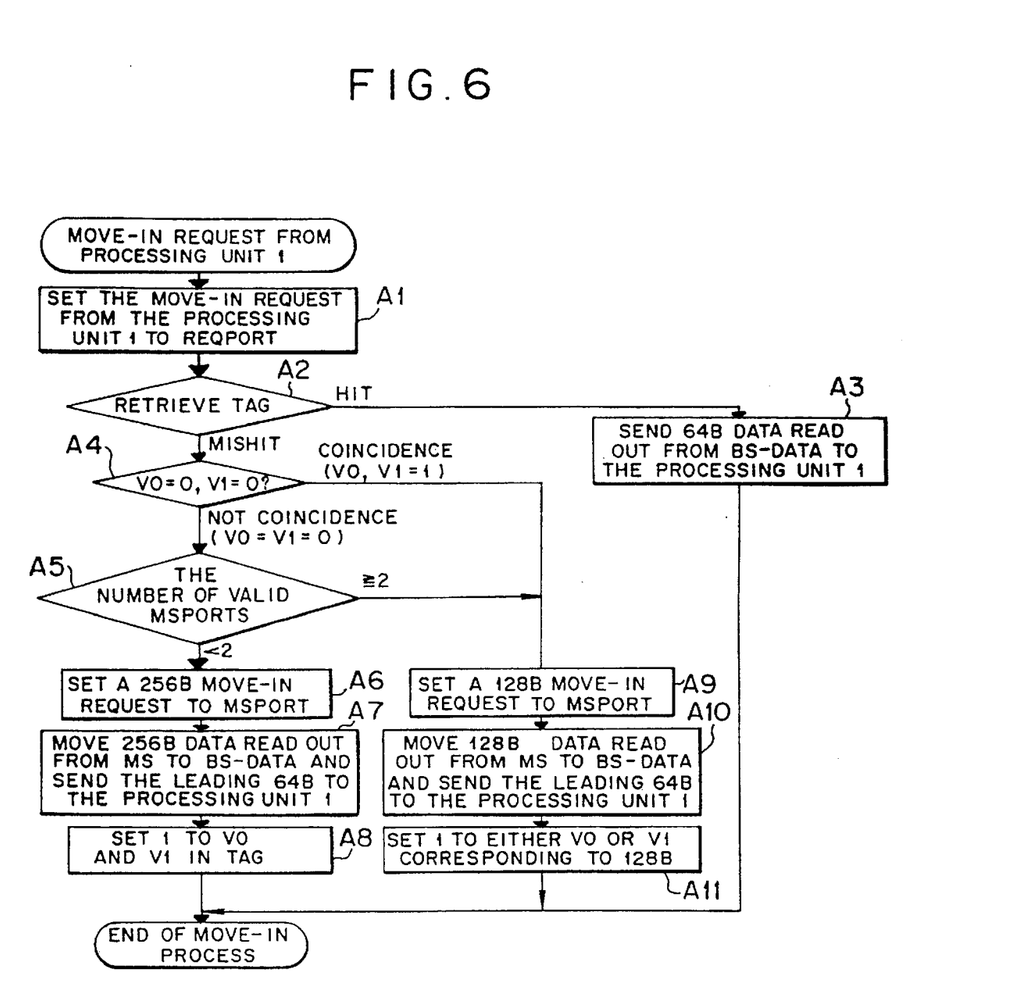
FIG. 6 is a flowchart illustrating an operation of the information processing system according to the first embodiment.
Figure 8:
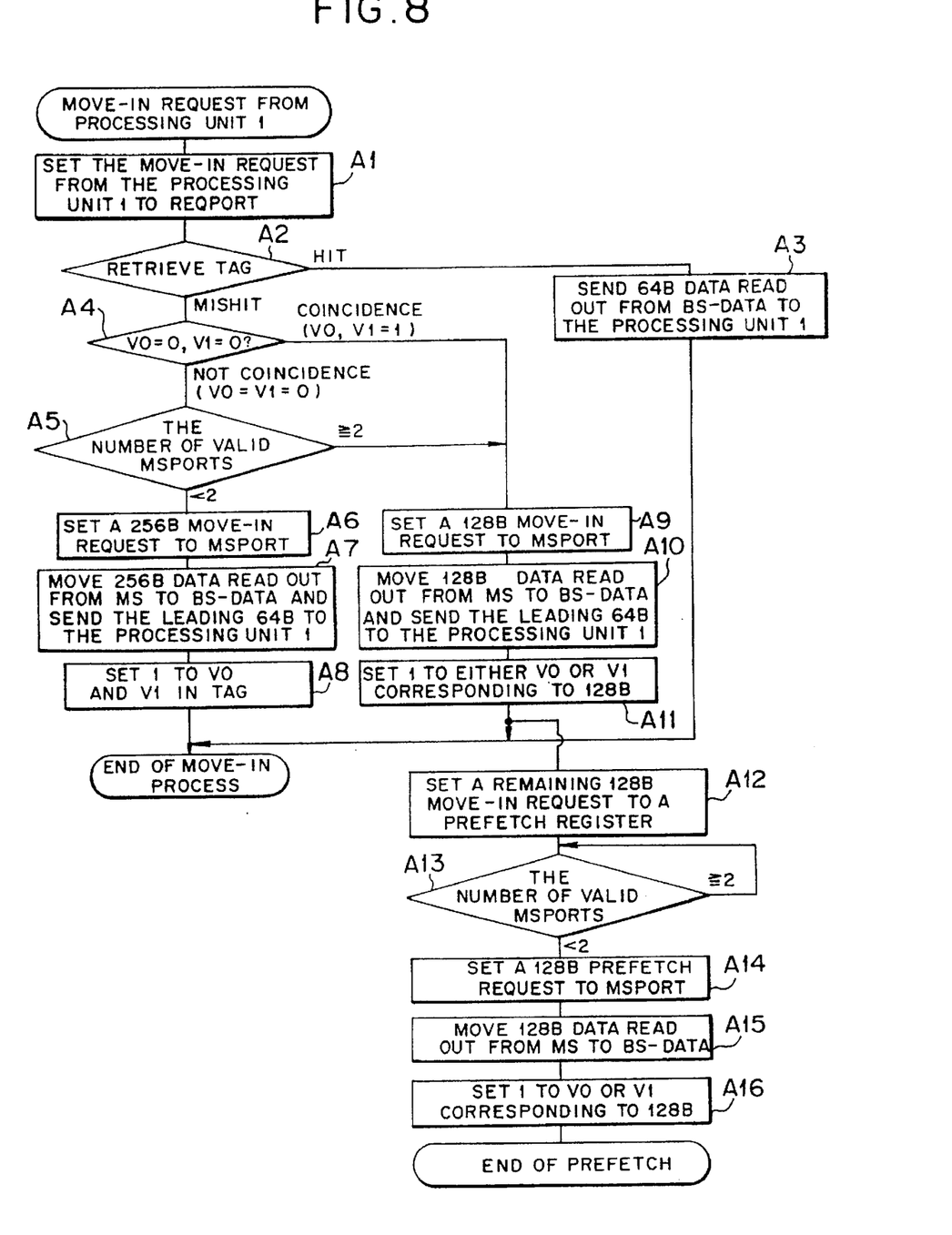
FIG. 8 is a flowchart illustrating an operation of the information processing system according to the second embodiment.

As shown in FIG. 8, the information processing system of the second embodiment operates substantially the same as the information processing system of the first embodiment shown in FIG. 6. The operation of the information processing system of the second embodiment shown in Steps A1–A11 is quite the same as the first embodiment, whose detailed description is omitted here.

In the second embodiment, if there is judged to be a large load on the main storage unit 2 at Step A5, then a process of Steps A9 through A11 is performed, followed by a process of Steps A12–A16.

According to the first embodiment, the moved data quantity is cut out to 128 bytes when the main storage unit 2 is at a large load, and data of the remaining 128 bytes is moved when a request for that data is thereafter generated by the processing unit 1. According to the second embodiment, the additional provision of the prefetch register 70 and the selector 71 to the main storage control unit 4 permits automatic move-in of the data of the remaining 128 bytes when the main storage unit 2 changes from a large load to a small load.

More specifically, after data for 128 bytes has been moved, an address of the main storage unit 2 that is an object of the move-in is set to the prefetch register 70 (Step A12).

The move-in data quantity deciding circuit 43 watches whether the main storage unit 2 changed from a large load to a small load (whether the number of the ports 45 in use is 2 or less) (Step A13). When the main storage unit 2 changes into a small load, the selector 71 selects an address from the prefetch register 70 so as to set a move-in request for the data of the remaining 128 bytes to the disengaged port 45 (Step A14).

After the requested data has been sent from the main storage unit 2 to the data unit 32 and the processing unit 1 (Step A15), either the bit "V0" or the bit "V1" that is 0 in an entry of the tag unit 31 storing the data is set to "1" (Step A16).

As above, the second embodiment may accomplish the same effects as the first embodiment. Moreover, after a moved data quantity has been cut out when the main storage unit 2 is at a large load, the remaining data in the block that is an object of the move-in is automatically moved when the main storage unit 2 changes into a small load, thereby preventing a decrease in the hit rate in the following data access.

In the above embodiments, a data block in the buffer storage 3 is divided into 128 bytes of a former half and 128 bytes of a latter half to be moved. This invention is not limited to the above example. For example, it is possible to divide the data block into small pieces. In such a case, the number of the valid bits V0, V1 shown in FIG. 3 is increased according to the number of the pieces and the invention is practiced in the same manner as the above embodiments.

In the embodiments set forth above, description has been made in the case of four WAYs and four ports 45. This invention is not limited to such numbers of the WAYs and ports 45.

What is claimed is:

1. A storage control method in an information processing system having a main storage unit with ports, a processing unit operating on the basis of data in said main storage unit and a buffer storage holding a copy of a part of said data in the main storage unit, said method comprising the steps of:

detecting a load on said main storage unit prior to moving a block of said data from said main storage unit to said buffer storage, wherein the load is determined by a number of the ports in use;

altering a quantity of the data in the block to be moved from said main storage unit to said buffer storage so as to reduce the quantity of the data when the detected load on said main storage unit is large; and resuming move-in of a remaining portion of the block of said data from said main storage unit to said buffer storage when the load on said main storage unit becomes small.

2. The storage control method in an information processing system according to claim 1, wherein the altered quantity in the block of said data to be moved is one-nth (where n is an integer at least as great as 2 of a data quantity in the block of said data moved when said main storage unit is at a small load.

3. A storage control apparatus in an information processing system having a main storage unit with ports, a processing unit operating on the basis of data in said main storage unit and a buffer storage holding a copy of a part of the data in said main storage unit, said storage control apparatus comprising:

a load detecting unit detecting a load on said main storage unit when a block of said data is moved from said main storage unit to said buffer storage, wherein the load is determined by a number of the ports in use;

a move-in data quantity altering unit altering a quantity of data in the block to be moved from said main storage unit to said buffer storage so as to reduce the quantity of the data when the load on said main storage unit detected by said load detecting unit is large; and a move-in resumption processing unit to resume move-in of the remaining part of the block of the data from said main storage unit to said buffer storage when the load on said main storage unit becomes small after said move-in data quantity altering unit has reduced the quantity of the data moved from said main storage unit to the buffer storage.

4. The storage control apparatus in an information processing system according to claim 3, wherein said moved data quantity altering unit outputs one-nth (where n is an integer at least as great as 2 of the data quantity in the block of said data moved when said main storage unit is at a small load, as the altered quantity of said blocks of said data.

* * * * *